(12) United States Patent
Yokoyama et al.

(10) Patent No.: US 9,102,771 B2
(45) Date of Patent: Aug. 11, 2015

(54) METHOD FOR PRODUCING A WATER-ABSORBENT RESIN

(75) Inventors: Hideki Yokoyama, Himeji (JP); Atsushi Heguri, Himeji (JP); Nobuhiro Maeda, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 14/125,818

(22) PCT Filed: Jul. 20, 2011

(86) PCT No.: PCT/JP2011/066457
§ 371 (c)(1),
(2), (4) Date: Jan. 27, 2014

(87) PCT Pub. No.: WO2012/176342
PCT Pub. Date: Dec. 27, 2012

(65) Prior Publication Data
US 2014/0179886 A1 Jun. 26, 2014

(30) Foreign Application Priority Data

Jun. 24, 2011 (JP) ................................ 2011-140169

(51) Int. Cl.
| | | |
|---|---|---|
| C08F 2/00 | (2006.01) | |
| C08F 20/06 | (2006.01) | |
| C08F 120/06 | (2006.01) | |
| C08F 2/18 | (2006.01) | |
| C08F 2/32 | (2006.01) | |
| C08F 220/06 | (2006.01) | |
| B01J 20/26 | (2006.01) | |
| C08F 220/10 | (2006.01) | |
| C08F 220/56 | (2006.01) | |

(52) U.S. Cl.
CPC ............. *C08F 120/06* (2013.01); *B01J 20/267* (2013.01); *C08F 2/18* (2013.01); *C08F 2/32* (2013.01); *C08F 220/06* (2013.01); *C08F 220/10* (2013.01); *C08F 220/56* (2013.01)

(58) Field of Classification Search
CPC ............ C08F 2/18; C08F 2/32; C08F 220/06; C08F 120/06; B01J 20/267; A61K 15/22; A61K 15/60; C08L 33/02
USPC ....................... 526/212, 207, 317.1
See application file for complete search history.

(56) References Cited

U.S. PATENT DOCUMENTS

| | | | |
|---|---|---|---|
| 4,742,086 A * | 5/1988 | Masamizu et al. ............... | 521/62 |
| 4,839,395 A | 6/1989 | Masamizu et al. | |
| 2004/0110913 A1 | 6/2004 | Kanto et al. | |
| 2010/0331802 A1 | 12/2010 | Yokoyama et al. | |

FOREIGN PATENT DOCUMENTS

| | | |
|---|---|---|
| CN | 1492884 A | 4/2004 |
| CN | 101835809 A | 9/2010 |
| EP | 2599796 A1 | 6/2013 |
| EP | 2599797 A1 | 6/2013 |
| JP | 61-087702 A | 5/1986 |
| JP | 62-106902 A | 5/1987 |
| JP | 62-172006 A | 7/1987 |
| JP | 07-025917 A | 1/1995 |
| JP | 2006-342306 A | 12/2006 |

OTHER PUBLICATIONS

Extended European Search Report dated Oct. 15, 2014, issued in corresponding EP application No. 11868374.7 (7 pages).
Notification of Transmittal of Translation of the International Preliminary Report on Patentability (Forms PCT/IB/326) of International Application No. PCT/JP2011/066457 mailed Jan. 9, 2014 with Forms PCT/IB/373, and PCT/ISA/237, w/ English translation (8 pages).
International Search Report for PCT/JP2011/066457, Mailing Date of Sep. 13, 2011.
Chinese Office Action dated Dec. 2, 2014, issued in corresponding Chinese Patent Application No. 201180071872.1 (6 pages).
Office Action dated May 13, 2015, issued in corresponding Chinese Patent Application No. 201180071872.1 (6 pages).

\* cited by examiner

*Primary Examiner* — William Cheung
(74) *Attorney, Agent, or Firm* — Westerman, Hattori, Daniels & Adrian, LLP

(57) ABSTRACT

A method is disclosed for producing a water-absorbent resin by a reversed-phase suspension polymerization method, wherein an odor originating from a raw material component, in particular, a petroleum hydrocarbon dispersion medium, is further reduced as compared with a water-absorbent resin obtained by a conventional method, and a water-absorbent resin obtained by the method. More specifically, a method is disclosed for producing a water-absorbent resin by performing a reversed-phase suspension polymerization of a water-soluble ethylenically unsaturated monomer in a petroleum hydrocarbon dispersion medium, comprising adding and dispersing an aqueous solution of a water-soluble ethylenically unsaturated monomer containing a hydrophilic polymeric dispersion agent to a petroleum hydrocarbon dispersion medium in the presence of a surfactant under stirring, and performing a reversed-phase suspension polymerization using a radical polymerization initiator, and a water-absorbent resin obtained by the method.

13 Claims, No Drawings

METHOD FOR PRODUCING A WATER-ABSORBENT RESIN

TECHNICAL FIELD

The present invention relates to a method for producing a water-absorbent resin, and to a water-absorbent resin obtained by the same.

More specifically, the present invention relates to a method for producing a water-absorbent resin by a reversed-phase suspension polymerization method, wherein an odor originating from a raw material component, in particular, a petroleum hydrocarbon dispersion medium, is reduced as compared with a water-absorbent resin obtained by a conventional method, and to a water-absorbent resin obtained by the method.

BACKGROUND ART

Water-absorbent resins are widely used in hygienic materials such as disposable diapers and sanitary napkins; daily commodities such as pet sheets; water absorbing sheets for food products; industrial materials such as water blocking materials for cables; water retention agents for greening/agriculture/horticulture; and the like.

Hygienic materials such as disposable diapers and sanitary napkins are generally constituted with a top sheet, a back sheet, a hot melt adhesive, an elastic material, a water-absorbent resin and a pulp fiber, various synthetic resins and modifiers are used. Therefore, an odor originating from raw material components is perceived from the hygienic materials, in some cases. Since these hygienic materials are put on the human body, the odor makes users uncomfortable even if it is subtle and, therefore, it is desired to develop an odor-free material.

Among constituent materials of these hygienic materials, the water-absorbent resin has a subtle odor originating from the substances used in the production process, and since the odor tends to emit upon water absorption, it is considered to be desirable to reduce the odor.

As water-absorbent resins used for hygienic materials, for example, a partially-neutralized product of polyacrylic acid, a neutralized product of a starch-acrylic acid graft polymer, a hydrolysate of a starch-acrylonitrile graft copolymer, a saponified product of a vinyl acetate-acrylic acid ester copolymer are known.

As methods for producing such water-absorbent resins, an aqueous polymerization method and a reversed-phase suspension polymerization method are known. In a case where a water-absorbent resin is produced by a reversed-phase suspension polymerization method in which polymerization is performed by suspending a water-soluble monomer in a dispersion medium, a major cause of the odor is considered to originate from the dispersion medium.

As conventional methods for producing the water-absorbent resin by a reversed-phase suspension polymerization method, known are a method of polymerizing an aqueous solution of α,β-unsaturated carboxylic acid and alkali metal salt thereof in a petroleum hydrocarbon solvent using a radical polymerization initiator in the presence or absence of a internal-crosslinking agent in which a sucrose fatty acid ester is used as a protective colloid agent (see Patent Document 1), and a method of polymerizing a 25% by mass or more of aqueous solution of an α,β-unsaturated carboxylic acid and alkali metal salt thereof in a petroleum hydrocarbon solvent using a radical polymerization initiator in the presence or absence of a internal-crosslinking agent in which a polyglycerol fatty acid ester with an HLB of 2 to 16 is used as a surfactant (see Patent Document 2). However, these production methods do not focus on reduction of an odor, and thus odors of the resultant water-absorbent resins are not sufficiently low.

REFERENCE DOCUMENTS

Patent Documents

[Patent Document 1] JP-A No. 61-87702
[Patent Document 2] JP-A No. 62-172006

SUMMARY OF THE INVENTION

Problems to be Solved by the Invention

An object of the present invention relates to a method for producing a water-absorbent resin, and a water-absorbent resin obtained by the method.

More specifically, an object of the present invention is to provide a method for producing a water-absorbent resin by a reversed-phase suspension polymerization method, wherein an odor originating from a raw material component, in particular, a petroleum hydrocarbon dispersion medium, is further reduced as compared with a water-absorbent resin obtained by a conventional method, and to a water-absorbent resin obtained by the method.

Means for Solving the Problems

The present inventors intensively studied about a relation between an odor originating from a petroleum hydrocarbon dispersion medium when the water-absorbent resin absorbs water, and a petroleum hydrocarbon dispersion medium used in production of the water-absorbent resin, and the like and, as a result, found out to obtain a water-absorbent resin having a significantly reduced odor as compared with a water-absorbent resin obtained by a conventional method, by adding and dispersing an aqueous solution of a water-soluble ethylenically unsaturated monomer containing a hydrophilic polymeric dispersion agent to a petroleum hydrocarbon dispersion medium under stirring, and then performing a reversed-phase suspension polymerization using a radical polymerization initiator.

That is, the present invention relates to a method for producing a water-absorbent resin shown below, and a water-absorbent resin obtained by the method.

Item 1. A method for producing a water-absorbent resin by performing a reversed-phase suspension polymerization of a water-soluble ethylenically unsaturated monomer in a petroleum hydrocarbon dispersion medium, comprising adding and dispersing an aqueous solution of a water-soluble ethylenically unsaturated monomer containing a hydrophilic polymeric dispersion agent to a petroleum hydrocarbon dispersion medium in the presence of a surfactant under stirring, and performing a reversed-phase suspension polymerization using a radical polymerization initiator.

Item 2. The method according to Item 1 wherein the hydrophilic polymeric dispersion agent is at least one kind selected from the group consisting of polyvinyl alcohol and polyvinyl pyrrolidone.

Item 3. The method for producing a water-absorbent resin according to Item 1 or 2, wherein the surfactant is at least one kind selected from the group consisting of polyglyceryl fatty acid ester, sucrose fatty acid ester and sorbitan fatty acid ester.

Item 4. The method for producing a water-absorbent resin according to any one of Items 1 to 3, wherein the water-soluble ethylenically unsaturated monomer is at least one kind selected from the group consisting of acrylic acid and its salt, methacrylic acid and its salt, and acrylamide.

Item 5. The method according to any one of Items 1 to 4, wherein the petroleum hydrocarbon dispersion medium is at least one kind selected from the group consisting of an aliphatic hydrocarbon and an alicyclic hydrocarbon, having a carbon number of 6 to 8.

Item 6. A water-absorbent resin obtained by the method according to any one of Items 1 to 5.

Effects of the Invention

According to the present invention, a method for producing a water-absorbent resin, wherein an odor originating from a raw material component, in particular, a petroleum hydrocarbon dispersion medium, is reduced, and a water-absorbent resin obtained by the method are provided.

MODES FOR CARRYING OUT THE INVENTION

An origin of odor, when a water-abosorbent resin obtained by a reversed-phase suspension polymerization absorbs water, is mainly a dispersion medium remained within particles of the water-abosorbent resin. The present inventors have found out that a mechanism of a dispersion medium remaining in water-absorbent resin particles is caused by generating so-called capsule-like water-absorbent resin particles which include the dispersion medium based on generating a liquid droplet having a shape in which the disppersion medium which is an oil phase is entrapped in a liquid droplet of the aqueous monomer solution, namely, an O/W/O (oil/water/oil) type droplet, and then stabilizing and polymerizing this O/W/O type droplet itself, upon dispersing the aqueous monomer solution in the dispersion medium by means of stirring and the like.

The method for producing a water-absorbent resin of the present invention is characterized in that a hydrophilic polymeric dispersion agent exists in an aqueous solution of a water-soluble ethylenically unsaturated monomer when the above-mentioned aqueous solution of monomer containing a water-soluble radical polymerization initiator is dispersing in a petroleum hydrocarbon dispersion medium in the presence of surfactants, upon performing a reversed-phase suspension polymerization, and thereby generation of O/W/O (oil/water/oil) type droplet is suppressed as compared with the conventional method, and then polymelization is performing by using the water-soluble radical polymerization initiator.

An O/W/O type droplet is an abbreviation of (Oil in Water) in Oil, and refers to a state in which fine oil droplets are dispersed in water droplets, and the water droplets are further dispersed in an oil phase. Namely, it is constituted of an innermost oil phase, an intermediate water phase and an outermost oil phase. In the present invention, the O/W/O type droplet exhibits a state in which droplets of the aqueous solution of the monomer (water phase) contain smaller droplets of dispersion medium (oil phase).

As described in more detail, the present application comprises adding and dispersing an aqueous solution of a water-soluble ethylenically unsaturated monomer containing a hydrophilic polymeric dispersion agent to a petroleum hydrocarbon dispersion medium under stirring, and performing a reversed-phase suspension polymerization using a radical polymerization initiator.

A water-absorbent resin which contains a reduced amount of a remaining petroleum hydrocarbon dispersion medium, can be obtained by the production method comprising these steps of the reversed-phase suspension polymerization.

In the present invention, the "amount of a remaining petroleum hydrocarbon dispersion medium" (Amount of remaining dispersion medium) is a value measured by a measuring method described hereinafter.

The present invention comprises mixing and dispersing an aqueous solution of a water-soluble ethylenically unsaturated monomer (hereinafter, "aqueous monomer solution" means the "aqueous solution of the water-soluble ethylenically unsaturated monomer" unless otherwise expressly indicated) containing a hydrophilic polymeric dispersion agent in a petroleum hydrocarbon dispersion medium (hereinafter, "dispersion medium" means the "petroleum hydrocarbon dispersion medium" unless otherwise expressly indicated) in the presence of a surfactant in the above-mentioned dispersing step to perform a reversed-phase suspension polymerization. The present invention is intended to reduce an amount of the remaining dispersion medium by suppressing generation of O/W/O type droplet as compared with conventional methods.

Examples of the water-soluble ethylenically unsaturated monomer used in the present invention include monomers having an acid group, such as (meth)acrylic acid ["(meth)acrylic" means "acrylic" and "methacrylic", the same shall apply hereinafter], 2-(meth)acrylamide-2-methylpropanesulfonic acid and maleic acid, and salts thereof; nonionic unsaturated monomers such as (meth)acrylamide, N,N-dimethyl(meth)acrylamide, 2-hydroxyethyl(meth)acrylate and N-methylol(meth)acrylamide; and amino group-containing unsaturated monomers such as diethylaminoethyl(meth)acrylate and diethylaminopropyl(meth)acrylate, and quaternized monomers thereof. These water-soluble ethylenically unsaturated monomers may be used alone, or two or more kinds of them may be used in combination.

Among water-soluble ethylenically unsaturated monomers, (meth)acrylic acid and a salt thereof, and (meth)acrylamide are preferable from a viewpoint of industrial availability.

When the water-soluble ethylenically unsaturated monomer has an acid group, it can also be used as a salt after neutralizing the acid group.

Examples of an alkaline compound used when a monomer having an acid group is neutralized to a salt include compounds of lithium, sodium, potassium and ammonium. More specifically, examples of the alkaline compound include sodium hydroxide, potassium hydroxide, lithium hydroxide, sodium carbonate and ammonium carbonate.

When the monomer having an acid group is neutralized, a neutralization degree is preferably from 30 to 90 mol % of the acid group of the water-soluble ethylenically unsaturated monomer. When the neutralization degree is less than 30 mol %, the acid group is not easily ionized and water-absorption capacity deteriorates, and therefore it is not preferred. When the neutralization degree is more than 90 mol %, safety issues may arise when used as hygienic materials, and therefore it is not preferred.

For the timing of neutralization, although it is common to be performed in a monomeric state from a viewpoint of a degree of homogeneity, neutralization by adding the above-mentioned alkaline compound to a polymer after a monomer polymerization, so called post-neutralization, may be also used together.

In the present invention, a water-soluble ethylenically unsaturated monomer is used as an aqueous solution. The concentration of the monomer in the aqueous solution of a water-soluble ethylenically unsaturated monomer is preferably from 20% by mass to saturation concentration. If necessary, the aqueous solution of a water-soluble ethylenically unsaturated monomer may contain a chain transfer agent and the like.

Examples of the chain transfer agent include compounds such as thiols, thiolic acids, secondary alcohols, hypophosphorous acid and phosphorous acid. These chain transfer agents may be used alone, or two or more kinds of them may be used in combination.

Examples of the petroleum hydrocarbon dispersion medium include aliphatic hydrocarbon having a carbon number of 6 to 8, such as n-hexane, n-heptane, 2-methylhexane, 3-methylhexane, 2,3-dimethylpentane, 3-ethylpentane and n-octane; alicyclic hydrocarbons having a carbon number of 6 to 8, such as cyclohexane, methylcyclohexane, cyclopentane, methylcyclopentane, trans-1,2-dimethylcyclopentane, cis-1,3-dimethylcyclopentane and trans-1,3-dimethylcyclopentane; and aromatic hydrocarbons such as benzene, toluene and xylene. Among these hydrocarbon dispersion media, aliphatic hydrocarbons having a carbon number of 6 to 8, such as n-heptane, 2-methylhexane, 3-methylhexane and n-octane; and alicyclic hydrocarbons having a carbon number of 6 to 8, such as cyclohexane, methylcyclopentane and methylcyclohexane are preferably used from a viewpoint of easy industrial availability. These hydrocarbon dispersion media may be used alone, or two or more kinds of them may be used in combination.

Further, among these hydrocarbon dispersion media, n-heptane and cyclohexane are preferably used from a viewpoint that a state of W/O type reversed suspension is good, suitable particle size is easily obtained, and that an industrial availability is easy and a quality is stable. Further, as an example of a mixture of the above-mentioned hydrocarbon, a commercially available Exxsol Heptane (manufactured by Exxon Mobil Co.: containing heptane and isomeric hydrocarbons of 75 to 85%) and the like may be used to obtain a suitable result.

The amount of the petroleum hydrocarbon dispersion medium to be used is usually from 50 to 600 parts by mass, more preferably from 60 to 400 parts by mass, and still more preferably from 70 to 200 parts by mass, based on 100 parts by mass of the aqueous solution of a water-soluble ethylenically unsaturated monomer from a viewpoint of uniformly dispersing of the aqueous solution of a water-soluble ethylenically unsaturated monomer and facilitating control of the polymerization temperature.

Examples of the surfactant used in the present invention include nonionic surfactants such as sorbitan fatty acid ester, polyoxyethylene sorbitan fatty acid ester, polyglyceryl fatty acid ester, polyoxyethylene glyceryl fatty acid ester, sucrose fatty acid ester, sorbitol fatty acid ester, polyoxyethylene sorbitol fatty acid ester, polyoxyethylene alkyl ether, polyoxyethylene alkyl phenyl ether, polyoxyethylene castor oil, polyoxyethylene hydrogenated castor oil, alkyl allyl formaldehyde condensed polyoxyethylene ether, polyoxyethylene polyoxypropyl alkyl ether, polyethylene glycol fatty acid ester, alkyl glucoside, N-alkyl gluconamide, polyoxyethylene fatty acid amide and polyoxyethylene alkylamine; and anionic surfactants such as fatty acid salt, alkylbenzene sulfonate, alkylmethyl taurate, polyoxyethylene alkyl phenyl ether sulfate, polyoxyethylene alkyl ether sulfate, polyoxyethylene alkyl ether sulfonic acid and a salt thereof, polyoxyethylene alkyl phenyl ether phosphoric acid and a salt thereof, and polyoxyethylene alkyl ether phosphoric acid and a salt thereof. These surfactants may be used alone, or two or more kinds of them may be used in combination.

Among these surfactants, at least one kind selected from the group consisting of polyglyceryl fatty acid ester, sucrose fatty acid ester and sorbitan fatty acid ester are preferred from a viewpoint of dispersion stability of the aqueous solution of a water-soluble ethylenically unsaturated monomer.

The amount of the surfactant to be added in the present invention is preferably from 0.01 to 5 parts by mass, and more preferably from 0.05 to 3 parts by mass, based on 100 parts by mass of the aqueous solution of a water-soluble ethylenically unsaturated monomer. When the amount of the surfactant to be added is less than 0.01 part by mass, dispersion stability of the aqueous monomer solution deteriorates, and therefore it is not preferred. When the amount of the surfactant to be added is more than 5 parts by mass, it is not economic, being not preferable.

In the present invention, when the aqueous solution of a water-soluble ethylenically unsaturated monomer is added and dispersed in the petroleum hydrocarbon dispersion medium in the presence of surfactants, it is preferable to disperse the above-mentioned aqueous solution in the presence of a hydrophobic polymeric dispersion agent from a viewpoint of reducing the amount of the remaining petroleum hydrocarbon dispersion medium to a lower level.

As the hydrophobic polymeric dispersion agent, it is preferred to select and use those which are dissolved or dispersed in the petroleum hydrocarbon dispersion medium to be used, and examples of the hydrophobic polymeric dispersion agent include those having a viscosity-average molecular weight of 20,000 or less, preferably 10,000 or less, and more preferably 5,000 or less. Specific examples thereof include maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, an oxidized ethylene-propylene copolymer, an ethylene-acrylic acid copolymer, ethyl cellulose, ethylhydroxyethyl cellulose, anhydrous maleinated polybutadiene and anhydrous maleinated EPDM (ethylene/propylene/diene terpolymer).

Among them, at least one kind selected from the group consisting of maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene and an oxidized ethylene-propylene copolymer is preferred.

The amount of the hydrophobic polymeric dispersion agent to be added is preferably 5 parts by mass or less, more preferably from 0.01 to 3 parts by mass, and still more preferably from 0.05 to 2 parts by mass, based on 100 parts by mass of the aqueous solution of a water-soluble ethylenically unsaturated monomer. When the amount of the hydrophobic polymeric dispersion agent to be added is more than 5 parts by mass, it is not economic, being not preferable.

It is important that a hydrophobic polymeric dispersion agent is added to a petroleum hydrocarbon dispersion medium, and then the above dispersion medium is warmed once to establish a state where a part or whole of the hydrophobic polymeric dispersion agent is dissolved or dispersed thereafter an aqueous monomer solution is added. There is no problem even if the above dispersion medium is cooled after heating to perform an addition of the aqueous monomer solution in a state where a part or whole of the hydrophobic polymeric dispersion agent is precipitated to be dispersed in cloud state.

When the aqueous solution of a water-soluble ethylenically unsaturated monomer is added to and dispersed in the petroleum hydrocarbon dispersion medium, the aqueous solution of the water-soluble ethylenically unsaturated monomer is dispersed by stirring. However, stirring conditions vary depending on a desired dispersed droplet diameter and, therefore cannot be determined unconditionally.

The dispersed droplet diameter can be adjusted dispersed droplet diameter can be adjusted by changing a type, size, rotation numbers of a stirring impeller.

It is possible to use, as a stirring impeller, a propeller impeller, a paddle impeller, an anchor impeller, a turbine impeller, a Pfaudler impeller, a ribbon impeller, a FULLZONE impeller (manufactured by Shinko Pantech Co., Ltd.), a MAXBLEND impeller (manufactured by Sumitomo Heavy Industries, Ltd.) and Super-Mix (manufactured by Satake Chemical Equipment Mfg., Ltd.).

The present invention is characterized by the presence of a hydrophilic polymeric dispersion agent in an aqueous monomer solution upon the dispersion. It is preferred that the hydrophilic polymeric dispersion agent is used in a state where it is previously added, dissolve to mix with an aqueous solution of the water-soluble ethylenically unsaturated monomer. Generation of O/W/O type particles can be suppressed at a lower level by dispersing the aqueous monomer solution containing a hydrophilic polymeric dispersion agent into a petroleum hydrocarbon dispersion medium in the presence of a surfactant.

As a hydrophilic polymeric dispersion agent, polyvinyl pyrrolidone (Abbreviated name "PVP"), polyvinyl alcohol (Abbreviated name "PVA"), polyglycerol, polyacrylate and the like can be used. These hydrophilic polymeric dispersion agents may be used alone, or two or more of them may be used in combination. Especially, polyvinyl pyrrolidone and polyvinyl alcohol are preferred since they can be easily handled from a viewpoint of solubility in water and the like, and they easily exert their effect.

An amount of the hydrophilic polymeric dispersion agent can not determined unconditionally, because its preferred amount varies depending on a kind and molecular weight of the hydrophilic polymeric dispersion agent to be used. However, it is preferably 0.1-7 parts by mass, more preferably 0.3-5 parts by mass, and most preferably 0.5-3 parts by mass based on 100 parts by mass of a water-soluble ethylene monomer.

When the amount of the hydrophilic polymeric dispersion agent to be used is less than 0.1 part by mass, the reduction effect for the remaining amount of the dispersion medium can not be sufficiently acquired. When the amount of the hydrophilic polymeric dispersion agent to be used is more than 7.0 parts by mass, it is not preferred since the viscosity of an aqueous monomer solution increases, stirring rate is needed to be greatly increased in order to obtain a targeted droplet diameter, and thereby O/W/O type droplets are easily generated.

Although molecular weight and the like of the hydrophilic polymeric dispersion agent is not limited in particular, they are within a range where the hydrophilic polymeric dispersion agent can be added to dissolve in an aqueous monomer solution. For example, for the polyvinyl pyrrolidone, the grade of K-15 to K-120 can be used, but K-30 to K-90 are easily used from a viewpoint of the reduction effect of the remaining dispersion medium. Moreover, although the degrees of saponification and the like of polyvinyl alcohol are not limited in particular, the degrees of saponification of not less than 85% is preferred. Further, Examples suitably used as polyvinyl alcohol include those having a degree of polymerization of approximate 100 to 3,000, and those are easily used from viewpoints of a reducing effect of the remaining dispersion medium and use after dissolving.

Although hydrophilic polymeric dispersion agents, such as polyvinyl pyrrolidone and polyvinyl alcohol, may generally be used as a water-soluble thickener, the present invention utilizes effects different from those for so-called thickener of a water soluble polymer.

According to the present inventors' study, for example cellulose derivatives, such as hydroxyethyl cellulose and ethyl cellulose, and the natural polysaccharides of guar gum and glucomannan, and the like do not have the reduction effect of the remaining dispersion medium as compared with the addition of the above-mentioned hydrophilic polymeric dispersion agents even by addition to a monomer aqueous solution. Thereby, it has been found out that few generations of O/W/O type droplets are suppressed only by simply increasing the viscosity of an aqueous monomer solution.

Moreover, although a mechanism for reduction in the amount of the remaining dispersion medium by using a hydrophilic polymeric dispersion agent, is not clear, it is speculated that when the aqueous monomer solution is added and dispersed in a dispersion medium in the presence of a surfactant, the dispersion medium containing the surfactant is entrapped in an interior portion of a fine droplet of the aqueous monomer solution during dispersing the dispersion medium in the droplet of the aqueous monomer solution, and thereby an O/W/O type droplet which is an origin of the remaining dispersion medium is formed and stablized. It is also speculated that the hydrophilic polymeric dispersion agent has an effect that the hydrophilic polymeric dispersion agent exists on the surface of the droplet of the aqueous monomer solution due to the surface active effect, and protects the surface of the droplet, to suppress an invasion of the dispersion medium into the interior portion.

The dispersion liquid obtained above is subjected to a radical polymerization to obtain water-absorbent resin particles in a hydrous gel state, in which the water-absorbent resin is dispersed in the petroleum hydrocarbon dispersion medium.

Examples of the water-soluble radical polymerization initiator include persulfates such as potassium persulfate, ammonium persulfate and sodium persulfate; peroxides such as hydrogen peroxide; and azo compounds such as 2,2'-azobis(2-amidinopropane)dihydrochloride, 2,2'-azobis[N-(2-carboxyethyl)-2-methylpropiondiamine] tetrahydrate, 2,2'-azobis(1-imino-1-pyrrolidino-2-methylpropane) dihydrochloride and 2,2'-azobis[2-methyl-N-(2-hydroxyethyl)-propionamide].

Among them, potassium persulfate, ammonium persulfate, sodium persulfate and 2,2'-azobis(2-amidinopropane)dihydrochloride are preferred from a viewpoint of availability and easiness of handling.

The water-soluble radical polymerization initiator may be used in combination with reducing agents such as sulfite and ascorbic acid as a redox polymerization initiator.

The amount of the water-soluble radical polymerization initiator to be used is usually from 0.01 to 1 part by mass based on 100 parts by mass of the water-soluble ethylenically unsaturated monomer. When the amount is less than 0.01 part by mass, the degree of polymerization decreases, and when the amount is more than 1 part by mass, a rapid polymerization reaction arises. Therefore, both cases are not preferred.

Timing of the addition of the water-soluble radical polymerization initiator is not limited in particular, but it is preferred to previously add the water-soluble radical polymerization initiator to the aqueous solution of the water-soluble ethylenically unsaturated monomer from a viewpoint of homogeneity.

Moreover, upon polymerization, an internal-crosslinking agent may be added to an aqueous solution of the monomer. Examples of the internal-crosslinking agent include polyols such as (poly)ethylene glycol ["(poly)" means a case where a prefix "poly" is attached or not, the same shall apply hereinafter], 1,4-butanediol, glycerol and trimethylolpropane; polyunsaturated esters having two or more vinyl groups obtained by reacting polyols with an unsaturated acid such as acrylic acid or methacrylic acid; bisacrylamides such as N,N'-methylenebisacrylamide; and polyglycidyl compounds having two or more glycidyl groups, such as (poly)ethylene glycol diglycidyl ether, (poly)ethylene glycol triglycidyl ether, (poly)glycerol diglycidyl ether, (poly)glycerol triglycidyl ether, (poly)propylene glycol polyglycidyl ether and (poly) glycerol polyglycidyl ether. These internal-crosslinking agents may be used alone, or two or more kinds of them may be used in combination.

The amount of the internal-crosslinking agent to be added is preferably 3 parts by mass or less, more preferably 1 part by mass or less, and still more preferably from 0.001 to 0.1 part by mass, based on 100 parts by mass of the water-soluble ethylenically unsaturated monomer. When the amount is more than 3 parts by mass, excess crosslinking arises and water-absorption capability excessively deteriorates, and therefore it is not preferred.

It is preferred that the internal-crosslinking agent is previously added to the aqueous solution of the water-soluble ethylenically unsaturated monomer.

The reaction temperature during reversed-phase suspension polymerization in the present invention varies depending on the kind and amount of the polymerization initiator to be used, and therefore cannot be determined unconditionally. However, it is preferably from 20 to 100° C., and more preferably from 40 to 90° C. When the reaction temperature is lower than 20° C., the degree of polymerization may decrease, and when the reaction temperature is higher than 100° C., a rapid polymerization reaction arises. Therefore, both cases are not preferred.

In the above-mentioned reversed-phase suspension polymerization, particles in a hydrous gel state which may become a water-absorbent resin with a small amount of remaining dispersion medium are obtained. These resultant hydrous gel particles are dehydrated, dried, and post-crosslinked to obtain water-absorbent resin particles.

Moreover, this polymerization may be considered as the first stage polymerization, and an aqueous monomer solution may be added to a slurry with the dispersion medium containing the hydrous gel obtained from the polymerization to perform multi-stage polymerization such as two-stage polymerization or three-stage polymerization.

If the multi-stage polymerization is performed, the particle size after the first stage of polymerization obtained by polymerization of a water-soluble ethylenically unsaturated monomer is preferably the median particle size of 20-200 μm, more preferably 30-150 μm, and still more preferably 40-100 μm, from a viewpoint of obtaining a proper aggregated particle size in the multi-stage polymerization.

Besides, the median particle size of polymer particles after the first-stage polymerization is a value for particles obtained by dehydration and drying after completion of the first stage polymerization according to the measurement method described below.

When the second stage polymerization is performed, the aqueous solution of the water-soluble ethylenically unsaturated monomer of the second stage polymerization is added to the polymerization slurry obtained after completion of the above-mentioned first stage polymerization, and subsequently, reversed-phase suspension polymerization can be performed.

Procedures are started from precipitations at least a part of the above-mentioned surfactant after completion of the first stage polymerization.

Surfactants lose their essential capability to stabilize an aqueous phase droplet in an oil phase (or adversely, a capability to stabilize an oil phase droplet in an aqueous phase) when they precipite.

Examples of a precipitating method include, but not limited to, a method of decreasing a temperature of slurry after polymerization by cooling.

By precipitating at least a part of surfactants before adding the aqueous solution of a water-soluble ethylenically unsaturated monomer in the second stage polymerization, the droplet of the added aqueous monomer solution is not stabilized in a dispersion medium, and is absorbed in gel-like primary particles to enhance aggregation of the primary particles and thereby, a particle diameter suitable for use in hygienic materials is obtained.

In addition, due to precipitation of the surfactants, generation of new O/W/O type droplets upon adding the aqueous monomer solution of the second stage polymerization is suppressed to prevent increase in an amount of the remaining dispersion medium. Therefore obtained water absorbent resin has lower amount of remaining dispersion medium than that involved in the first stage polymerization, because amount of water absorbent resin substantially increases through the second stage polymerization which hardly increase in an amount of remaining dispersion medium. Besides, the hydrophobic polymeric dispersion agent dissolving together with the surfactants may precipitate into the dispersion medium upon adding the aqueous monomer solution in the second stage because the dispersion agent becomes impossible to be dissolved in a dispersion medium by cooling.

After precipitating at least a part of the surfactant, the aqueous solution of the water-soluble ethylenically unsaturated monomer of the second stage polymerization, which contains a water-soluble radical polymerization initiator, is stirred to mix to be absorbed and aggregated in the polymer gel in the first stage.

It is possible to use, as water-soluble ethylenically unsaturated monomer for the second-stage polymerization, the same as those exemplified as the water-soluble ethylenically unsaturated monomer for the first stage polymerization. Kinds, neutralization degree and neutralized salt of the monomer, and the concentration of the aqueous monomer solution may be the same as or different from those of the water-soluble ethylenically unsaturated monomer in the first stage polymerization.

The polymerization initiator to be added to an aqueous solution of a water-soluble ethylenically unsaturated monomer in the second stage polymerization, any one may be selected from those exemplified as the polymerization initiator used in the first stage polymerization to use.

If necessary, an internal-crosslinking agent and a chain transfer agent may also be added to the aqueous solution of a water-soluble ethylenically unsaturated monomer in the second stage polymerization, and any one may be selected from those exemplified for the first stage polymerization to use.

The amount of the water-soluble ethylenically unsaturated monomer to be added in the second stage polymerization is preferably from 1.0 to 2.0-fold, and more preferably from 1.1 to 1.8-fold, based on the amount of the water-soluble ethylenically unsaturated monomer in the first stage polymerization from viewpoints of obtaining appropriate aggregated particles and reducing the amount of the remaining dispersion medium.

When the amount of the water-soluble ethylenically unsaturated monomer to be added is less than 1.0-fold, the reduction effect by the amount of the remaining dispersion medium is low, being not preferable because the amount to be obtained decreases.

When the amount of the water-soluble ethylenically unsaturated monomer to be added is more than 2.0-fold, aggregated particles having a proper median particle size are not obtained, being not preferable because particles polymerized in the first stage polymerization cannot absorb fully the aqueous monomer solution in the second stage polymerization to cause fine powders.

It is sufficient that the entire components are mixed uniformly by stirring in the second stage reversed-phase suspension polymerization. The median particle size of aggregated particles may be controlled depending on a precipitation state of the surfactants and a ratio of the amount of the ethylenically unsaturated monomer in the second stage polymerization to the ethylenically unsaturated monomer in the first stage polymerization.

Additionally, the median particle size of the aggregated particles suitable for use in hygienic materials is preferably from 200 to 600 μm, more preferably from 250 to 500 μm, and still more preferably from 300 to 450 μm.

After adding the aqueous monomer solution for a second stage polymerization, polymerization is performed by means of a radical polymerization by warming and the like.

The reaction temperature in reversed-phase suspension polymerization in the second stage polymerization cannot be determined unconditionally because it depends on the kind and amount of the polymerization initiator. However, it is preferably from 20 to 100° C., and more preferably from 40 to 90° C.

Furthermore, for the purpose of improving productivity, multi-stage reversed-phase suspension polymerization may be performed by performing a third or later stage polymerization reaction similar to the second stage reversed-phase suspension polymerization.

In reversed-phase suspension polymerization using the hydrophilic polymeric dispersion agent shown in the present application, a dispersion medium can be added upon performing a dehydration process by refluxing a dispersion medium in azeotropic distillation after completion of the polymerization, in order to prevent aggregation of particles.

Especially, when polyvinyl alcohol and polyglycerol are used as the hydrophilic polymeric dispersion agent, it is preferred that the a dispersion medium is added such that W/O ratio calculated by dividing the total amount (total of the aqueous monomer solution of the first stage plus the second stage polymerizations when it was polymerized in two stages) of the aqueous monomer solution used in the polymerization by the amount of a petroleum hydrocarbon dispersion medium, is less than 1.7, and more specifically less than 1.4. When a dehydration is performed at a inner temperature of not less than 80° C. by means of azeotropy dehydration in W/O ratio of not less than 1.7, a phenomenon that aggregated particles are further aggregated and precipitated is observed, and the median particle size of the resultant water-absorbent resin may be not less than 1,000 μm.

Although the detailed mechanism is unknown, it is presumed that aggregation of particles is promoted due to adherence of a hydrophilic polymeric dispersion agent such as polyvinyl alcohol and polyglycerol existing on the particle surfaces when there is not the sufficient amount of the dispersion medium relative to the hydrous gel particles obtained by the polymerization.

The timing for adding the dispersion medium is not particularly limited, it may be added in any time before the dehydration process. However, in the case of cooling for the purpose of deactivation of surfactants after completion of the first stage polymerization, and the like, it is preferred that the dispersion medium at a low temperature after completion of the first stage polymerization as well as considering a cooling effect.

After completion of these multi-stages of reversed-phase suspension polymerization, it is preferred to add a post-crosslinking agent containing two or more functional groups having reactivity with a functional group derived from a water-soluble ethylenically unsaturated monomer. The crosslinking density of the surface layer of water-absorbent resin particles and various properties such as water-absorption capacity under load, water-absorption rate and gel strength can be enhanced by adding post-crosslinking agent after the polymerization for reaction, and to impart properties suitable for use in hygienic materials.

A post-crosslinking agent to be used in the post-crosslinking reaction is not particularly limited as long as it can react with a functional group derived from the water-soluble ethylenically unsaturated monomer used in the polymerization.

Examples of the post-crosslinking agent to be used include polyols such as ethylene glycol, propylene glycol, 1,4-butanediol, trimethylolpropane, glycerol, polyoxyethylene glycol, polyoxypropylene glycol and polyglycerol; polyglycidyl compounds such as (poly)ethylene glycol diglycidyl ether, (poly)ethylene glycol triglycidyl ether, (poly)glycerol diglycidyl ether, (poly)glycerol triglycidyl ether, (poly)propylene glycol polyglycidyl ether and (poly)glycerol polyglycidyl ether; haloepoxy compounds such as epichlorohydrin, epibromohydrin and α-methylepichlorohydrin; compound having two or more reactive functional groups, for example, isocyanate compounds such as 2,4-tolylene diisocyanate and hexamethylene diisocyanate; oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol and 3-butyl-3-oxetane ethanol; oxazoline compounds such as 1,2-ethylenebisoxazoline; and carbonate compounds such as ethylene carbonate. These post-crosslinking agents may be used alone, or two or more kinds of them may be used in combination.

Among them, polyglycidyl compounds such as (poly)ethylene glycol diglycidyl ether, (poly)ethylene glycol triglycidyl ether, (poly)glycerol diglycidyl ether, (poly)glycerol triglycidyl ether, (poly)propylene glycol polyglycidyl ether and (poly)glycerol polyglycidyl ether are preferred from a viewpoint of excellent reactivity.

The amount of the post-crosslinking agent to be added is preferably from 0.01 to 5 parts by mass, and more preferably from 0.02 to 3 parts by mass, based on 100 parts by mass of the total amount of the water-soluble ethylenically unsaturated monomer subjected to the polymerization. When the amount of the post-crosslinking agent to be added is less than 0.01 part by mass, it is impossible to enhance various properties such as water-absorption capacity under load, water-absorption rate and gel strength of the resultant water-absorbent resin, and when the amount to be added is more than 5 parts by mass, water-absorption capacity excessively deteriorates. Therefore both cases are not preferred.

The post-crosslinking agent may be added as it is, or added in a form of an aqueous solution. If necessary, the post-crosslinking agent may be added in a form of an aqueous solution containing a hydrophilic organic solvent. Examples of the hydrophilic organic solvent include lower alcohols such as methyl alcohol, ethyl alcohol, n-propyl alcohol, isopropyl alcohol and propylene glycol; ketones such as acetone and methyl ethyl ketone; ethers such as diethyl ether, dioxane and tetrahydrofuran; amides such as N,N-dimethylformamide; and sulfoxides such as dimethyl sulfoxide. These hydrophilic organic solvents may be used alone, or two or more kinds of them may be used in combination. Alternatively, these hydrophilic organic solvents may be used as a mixed solvent with water.

The timing of the addition of the post-crosslinking agent may be after completion of the polymerization and is not particularly limited. The post-crosslinking reaction is preferably performed in a dehydration or drying step after the polymerization in the presence of water at an amount within a range from 1 to 200 parts by mass, more preferably from 5 to 100 parts by mass, and still more preferably from 10 to 50 parts by mass, based on 100 parts by mass of the water-absorbent resin. By adjusting the amount of water during the addition of the post-crosslinking agent, post-crosslinking in the surface layer of particles of the water-absorbent resin can be more suitably performed and excellent water-absorption capability can be exhibited.

The temperature in the post-crosslinking reaction is preferably from 50 to 250° C., more preferably from 60 to 180° C., still more preferably from 60 to 140° C., and even more preferably from 70 to 120° C.

In the present invention, a drying step may be performed under a normal pressure or reduced pressure, or may be performed under a gas flow such as nitrogen gas flow in order to enhance drying efficacy. When the drying step is performed under a normal pressure, the drying temperature is preferably from 70 to 250° C., more preferably from 80 to 180° C., still more preferably from 80 to 140° C., and even more preferably from 90 to 130° C. When the drying step is performed under reduced pressure, the drying temperature is preferably from 60 to 100° C., and more preferably from 70 to 90° C.

The water content of the water-absorbent resin after drying is 20% or less, and preferably 10% or less, from a viewpoint of imparting fluidity. Inorganic lubricant agents such as an amorphous silica powder and the like may also be added to the water-absorbent resin so as to improve fluidity.

EXAMPLES

The median particle size, the water content, and the amount of the remaining dispersion medium (amount of petroleum hydrocarbon dispersion medium remaining in water-absorbent resin particles) of water-absorbent resins obtained in the respective Examples and Comparative Examples were evaluated by the following methods.

(1) Median Particle Size

A water-absorbent resin (50 g) was passed through a JIS standard sieve having a sieve opening size of 250 μm. The median particle size was measured using a combination of sieves (α) when 50% by mass or more of the resin remaining on the sieve, while using a combination of sieves (β) when less than 50% by mass of the resin remaining on the sieve.

(α) JIS standard sieves were combined in a downward order of; a sieve having a sieve opening size of 850 μm, a sieve having a sieve opening size of 600 μm, a sieve having a sieve opening size of 500 μm, a sieve having a sieve opening size of 425 μm, a sieve having a sieve opening size of 300 μm, a sieve having a sieve opening size of 250 μm, a sieve having a sieve opening size of 150 μm and a tray.

(β) JIS standard sieves were combined in a downward order of; a sieve having a sieve opening size of 425 μm, a sieve having a sieve opening of 250 μm, a sieve having a sieve opening size of 180 μm, a sieve having a sieve opening size of 150 μm, a sieve with a sieve opening size of 106 μm, a sieve with a sieve opening size of 75 μm, a sieve having a sieve opening size of 45 μm and a tray.

About 50 g of the water-absorbent resin was placed on the uppermost sieve of the combination, and classified for 20 minutes using a Rotap-type shaking machine.

After the sieve classification, the mass of the water-absorbent resin remaining on the respective sieves was calculated in terms of mass % based on the total mass of resin, the values were integrated in an order from the resins with a larger particle size, and thereby the relations between the sieve openings and integration values of the mass % of the water-absorbent resin remaining on the sieve were plotted on a logarithmic-probability paper. The plots on the logarithmic-probability paper were connected with a straight line, and the particle size corresponding to integrated mass % of 50% by mass was defined as the median particle size.

(2) Water Content

About 2.5 g of the water-absorbent resin was accurately weighed (X g) into an aluminum cup, and after drying at 105° C. with a hot air dryer for 2 hours, the mass of the dried water-absorbent resin was measured (Y g), and then the water content was calculated by the following equation. Besides, it is assumed that tare mass of the aluminium cup does not change before and after drying.

$$\text{Water content (\%)}=(X-Y)/X\times100$$

(3) Amount of Remaining Dispersion Medium

In order to measure an amount of a dispersion medium entrapping and remaining in water-absorbent resin particles, an aqueous phosphoric acid solution was absorbed (swelled) to a water absorbent resin in a sealed vial bottle, the vial bottle was heated and the dispersion medium was extracted to quantify the dispersion medium by means of a head-space gas chromatograph.

(a) Formation of Calibration Curve

Approximate 10 g of the petroleum hydrocarbon dispersion medium (hereinafter referred to as a "dispersion medium") used to polymerize a sample for measuring a remaining dispersion medium, is placed into a screw vial or the like to cool the vial with an ice-water bath.

Similarly, 60 g of DMF (dimethylformamide) and 60 g of 25% by mass of an aqueous phosphoric acid solution is also cooled with an ice-water bath. (Charging is performed after sufficiently cooling because of transpiration inhibition for the dispersion medium during charging.)

0.2 g of the above dispersion medium was accurately weighed into a 50 ml volumetric screw vial and then the above cooled DMF was added thereto to accurately make 20 g, followed by stirring with a magnetic stirrer bar to obtain Standard sample solution 1. This Standard sample solution 1 was also cooled with an ice-water bath. 0.2 g of the above Standard sample solution 1 was then accurately weighed into a 50 ml volumetric screw vial and the above cooled DMF was added thereto to accurately make 20 g, followed by stirring with a magnetic stirrer bar to obtain Standard sample solution 2. This Standard sample solution 2 was also cooled with an ice-water bath.

In a 20 ml volumetric vial bottle (No. 5, manufactured by Maruemu Corporation), 0.02, 0.05, 0.1 or 0.5 g of the above Standard sample solution 2 and 0.02, 0.1 or 0.2 g of the above Standard sample solution 1 were accurately weighed and the cooled DMF was added thereto to make the amount of contents in each vial bottle to a total amount of 3.8 g (4 ml). Furthermore, each vial bottle was charged with 5 ml of 25% by mass of the aqueous phosphoric acid solution, sealed and tightened with a septum rubber and an aluminium cap, and then stirring was performed by shaking each the bottle.

In addition, attention has been paid to perform quickly procedures from charging of the sample into the 20-ml volumetric vial to the sealing, to prevent a dispersion medium from transpiring from the vial as possible as much as possible.

Moreover, attention has been paid also to fully cool DMF and 25% by mass of an aqueous phosphoric acid solution such that the dispersion medium did not transpire due to generation of heat at the time of mixing the both reagents, and to fully mix them after sealing with an aluminium cap or the like.

This vial bottle was warmed at 110° C. for 2 hours, and 1 ml of a vapor phase portion was collected such that the vapor phase portion was not cooled, and then it was injected into a gas chromatograph to obtain a chromatogram.
(Use of Head Space Autosampler)

The amount to be charged of the dispersion medium in each vial bottle was calculated to prepare a calibration curve based on the amount to be charged and a peak area of the chromatogram. (When a mixture of petroleum hydrocarbons was used as the dispersion medium, plural peaks appeared and therefore a calibration curve was prepared based on a total value of the areas and the amount to be charged).

(b) Measurement of Amount of Dispersion Medium Remaining in Sample

About 2 g of a sample to be measured was charged into an aluminium cup and then dried with a hot air dryer at 105° C. for 2 hours to adjust the water content.

Required amounts of DMF (dimethylformamide) and 25% by mass of an aqueous phosphoric acid solution used for the measurement, were also charged into a screw bottle, and cooled with an ice-water bath.

Into a 20 ml volumetric vial bottle (No. 5, manufactured by Maruemu Corporation), 0.10 g of the above sample was accurately weighed, and the bottom of the vial bottle was dipped in an ice bath to cool the vial bottle and the water-absorbent resins.

To this vial bottle were added 4 ml of the above cooled DMF and, further 5 ml of 25% by mass of the above cooled aqueous phosphoric acid solution. The vial bottle was quickly tightened by sealing with a septum rubber and an aluminium cap and, then gently shaken to mix. After allowing to stand for 10 min, it was confirmed that the water-absorbent resin in the vial bottle was swelled, the vial bottle was vigorously shaken to agitate the inside strongly. This vial bottle was pre-heated at 110° C. for 2 hours to strongly agitate the inside again after heating. In addition, attention has been paid to perform quickly procedures from charging of the sample into the 20-ml volumetric vial to the sealing, to prevent a dispersion medium from transpiring from the vial as possible as much as possible.

This vial bottle was warmed at 110° C. for 2 hours, and 1 ml of a vapor phase portion was collected such that the vapor phase portion was not cooled, and then it was injected into a gas chromatograph to obtain a chromatogram.
(Use of Head Space Autosampler)

The amount of the dispersion medium contained in the amount (0.10 g of observed values) of the charged sample was calculated from the calibration curve made based on the peak area of the resultant chromatogram, and then converted into the amount [ppm] of the dispersion medium contained per 1 g of the sample.

The conditions of a gas chromatograph used in the measurement of the amount of the remaining dispersion medium in the present invention are as follows.

Model: GC-14A+HSS2B (HEADSPACE Autosampler) manufactured by Shimadzu Corporation
Filler: Squalane 25% Shimalite (NAW) (101)
80-100 mesh
Column: 3.2 mm in diameter×2.1 m
Column temperature: 80° C.
Injection port temperature: 180° C.
Detector temperature: 180° C.
Detector: FID
Gas carrier: Nitrogen gas
$V_i$al bottle heating temperature: 110° C.
Syringe setting temperature: 110° C.

(d) Measurement of Amount of Dispersion Medium Dissolved in Aqueous Monomer Solution in the Absence of Surfactants and the Like The following experiment was conducted for the purpose of investigating the amount of dispersion medium dissolved in an aqueous monomer solution in the absence of surfactants and the like.

Reference Experimental Example

A measurement of a dissolved amount of a dispersion medium in an aqueous monomer solution was performed by the following procedures:

1) Into a 500 mL Erlenmeyer flask, 46.0 g of 80% by mass of acrylic acid was charged and neutralized by adding dropwise 51.1 g of 30% by mass sodium hydroxide under stirring while cooling the flask from the outside. To this were added 21.9 g of ion exchange water to prepare an aqueous solution of a water-soluble ethylenically unsaturated monomer (the aqueous monomer solution having a neutralization degree of 75 mol % and a concentration of 38% by mass)

2) In a 2 L volumetric five-necked cylindrical separable round-bottom flask (hereinafter referred to as a "round-bottom flask") equipped with a stirrer with two steps of 50 mm in diameter pitched blade paddle impellers, a thermometer and a condenser, 171 g of n-heptane was weighted.

3) The above-mentioned round bottom flask was dipped in a water bath, and n-heptane was agitated at 500 rpm, and maintained to an inside temperature of 40±1° C.

4) The acrylic acid neutralization aqueous solution prepared in Procedure 1) was supplied, and the temperature of the water bath was adjusted to maintain the temperature such that it becomes an inside temperature of 40±1° C. while stirring at 500 rpm for 30 minutes.

5) After stirring for 30 minutes, the stirrer is stopped, and the round bottom flask is allowed to stand for 30 minutes while maintaining the same water bath temperature.

6) Only lower layer neutralization liquid layer was gently withdrawn such that two-layer separation is not mixed.

7) According to the measuring method of the amount of remaining dispersion medium, about 0.26 g (corresponding to about 0.1 g in the amount of the monomer) of the neutralized liquid withdrawn in 20 mL volumetric vial bottle was accurately weighted to add cooled DMF and phosphoric acid solution.

8) After sealing with a vial cap and stirring, preheating at 110° C. for 2 hours is performed, and according to the measuring method of the amount of remaining dispersion medium, the amount of n-heptane in the neutralized liquid was measured.

As experimental results, the same conditions as in the first stage polymerization described in the present application, namely, the amount of n-heptane (dispersion medium) dissolved in the acrylic acid neutralization aqueous solution (aqueous monomer solution) at 40° C., was 80 ppm on the monomer mass basis.

Therefore, this amount (80 ppm) of the dispersion medium was considered to be the minimum amount of the remaining dispersion medium which can be reduced by the conventional method (WO 2009/025235 and the like).

The present invention will be described in detail by way of Examples, but the present invention is not limited only to these Examples.

Example 1

0.7% by mass of polyvinyl alcohol (hereinafter abbreviated to "PVA") based on a mass of a monomer was added as a hydrophilic polymeric dispersion agent to perform a polymerization experiment.

Gosenol GH-20 (manufactured by Nippon Synthetic Chemical Industry Co., Ltd.: Degree of polymerization of 2000 and Degree of saponification of 86.5-89.0 mol %) as PVA was heated, stirred, dissolved in distilled water, and allowed to stand to prepare 100 g of 5% by mass aqueous solution of PVA prior to the preparation of an aqueous monomer solution.

Into a 500 mL Erlenmeyer flask, 92.0 g of 80% by mass of acrylic acid was charged and neutralized by adding dropwise 102.2 g of 30% by mass sodium hydroxide under stirring while cooling the flask from the outside.

To this were added 0.073 g of potassium persulfate, 10.1 mg of ethylene glycol diglycidyl ether, 12.6 g of the above-mentioned 5 mass % PVA aqueous solution and 10 g of distilled water to prepare an aqueous monomer solution having a monomer concentration of 38%.

In a 2 L volumetric five-necked cylindrical round-bottom separable flask equipped with a stirrer having a two-stage pitched blade paddle impellers of 50 mm in diameter, a thermometer, a reflux condenser and a nitrogen gas introducing tube, 282 g of Exxsol heptane (manufactured by Exxon Mobil Co.: Mixture of hydrocarbons, hereinafter referred to as a "dispersion medium") was weighted as a petroleum hydrocarbon dispersion medium.

To the round-bottom flask was added 0.74 g of a sucrose fatty acid ester (manufactured by Mitsubishi-Kagaku Foods Corporation, trade name: S-370) as a surfactant and 0.74 g of a maleic anhydride-modified ethylene-propylene copolymer (manufactured by Mitsui Chemicals, Inc., trade name: HIWAX 1105A) as a hydrophobic polymeric dispersion agent, and then this was warmed up to about 80° C. with a water bath at 85° C. at a stirring rate of 300 rpm to dissolve and disperse it before air cooling to an inner temperature of 64° C.

The above-mentioned aqueous monomer solution was charged once into the above dispersion medium with an increased stirring rate of 500 rpm by using a funnel made of SUS, having an inside diameter of 8 mm at opening at the tip. After adding the aqueous monomer solution, the atmosphere in the system was well substituted with nitrogen while maintaining the inner temperature of the round-bottom flask containing the dispersion at 40° C., and a radical polymerization reaction was performed by warming for 1 hour with a hot water bath at 70° C.

After the polymerization reaction, the stirring rate was increased to 1,000 rpm, 100 g of the dispersion medium was added to the flask, and the reaction suspension was heated using an oil bath at 120° C. and 125 g of water was removed off from the system by azeotropic distillation while refluxing the dispersion medium in the flask to obtain a dehydrated polymer dispersed in the dispersion medium. To the resultant dispersion medium dispersed dehydrated polymer, 3.4 g of a 2% aqueous solution of ethylene glycol diglycidyl ether as a post-crosslinking agent was added and the post-crosslinking reaction was performed at 83° C. for 2 hours.

Then, heating is performed using an oil bath at 120° C., the dispersion medium and water were removed off from the system by distillation, followed by drying under a nitrogen gas flow to obtain 87 g of a water-absorbent resin having a spherical shape (partially in a form of aggregated spherical particles) by passing through a sieve of 850 μm.

This water-absorbent resin had a median particle size of 83 μm, and a water content of 3.4%.

Example 2

The same operation as in Example 1, except that the stirring rate of 500 rpm for mixing and polimerizing the aqueous monomer solution in the dispersion medium in Example 1 was changed to 550 rpm, was performed to obtain 88 g of a water-absorbent resin having a spherical shape (partially in a form of aggregated spherical particles). This water-absorbent resin had a median particle size of 63 μm, and a water content of 2.8%.

Example 3

0.7% by mass of Gosenol GH-23 (manufactured by Nippon Synthetic Chemical Industry Co., Ltd.: Degree of polymerization of 2300 and Degree of saponification of 86.5-89.0 mol %) was used in place of Gosenol GH-20 in Example 1.

Specifically, PVA (Gosenol GH-23) was heated, stirred, dissolved in distilled water, and allowed to stand to prepare 100 g of 5% by mass aqueous solution of PVA prior to the preparation of an aqueous monomer solution.

Into a 500 mL Erlenmeyer flask, 92.0 g of 80% by mass of acrylic acid was charged and neutralized by adding dropwise 102.2 g of 30% by mass sodium hydroxide under stirring while cooling the flask from the outside.

To this were added 0.11 g of potassium persulfate, 8.3 mg of ethylene glycol diglycidyl ether, 12.6 g of the above-mentioned 5 mass % PVA aqueous solution and 31.4 g of distilled water to prepare an aqueous solution of the water-soluble ethylenically unsaturated monomer.

Then, the same operation as in Example 1 was performed to obtain 86 g of a water-absorbent resin having a spherical shape (partially in a form of aggregated spherical particles). This water-absorbent resin had a median particle size of 100 μm, and a water content of 3.3%.

Example 4

2.0% by mass of PVA as a hydrophilic polymeric dispersion agent was used based on an amount of the monomer.

Specifically, into a 500 mL Erlenmeyer flask, 92.0 g of 80% by mass of acrylic acid was charged and neutralized by adding dropwise 102.2 g of 30% by mass sodium hydroxide under stirring while cooling the flask from the outside.

To this were added 32.1 g of distilled water, followed by 1.81 g of PVA: Poval 403 (manufactured by Kuraray Co., Ltd.: Degree of polymerization of 300 and Degree of saponification of 78-83 mol %) as a hydrophilic polymeric dispersion agent to dissolve it by stirring. To this were added 0.073 g of potassium persulfate, 10.1 mg of ethylene glycol diglycidyl ether, and 10 g of distilled water to prepare an aqueous monomer solution.

Subsequently, the same operation as in Example 1, except that the stirring rate of 500 rpm for mixing and polimerizing the above-mentioned aqueous monomer solution in the dispersion medium is changed to 700 rpm, was performed to obtain 90 g of a water-absorbent resin having a spherical shape (partially in a form of aggregated spherical particles). This water-absorbent resin had a median particle size of 51 μm, and a water content of 2.3%.

Example 5

Two-stage polymerization was performed by using a polymerization according to Example 2 as the first stage polymerization.

Into a 500 mL Erlenmeyer flask, 92.0 g of 80% by mass of acrylic acid was charged and neutralized by adding dropwise 102.2 g of 30% by mass sodium hydroxide under stirring while cooling the flask from the outside. To this were added 0.07 g of potassium persulfate, 10.1 mg of ethylene glycol diglycidyl ether, 12.7 g of the above-mentioned 5 mass % PVA aqueous solution in Example 2 as a hydrophilic polymeric dispersion agent and 30.9 g of distilled water to prepare, stir and mix an aqueous monomer solution.

In a 2 L volumetric five-necked cylindrical round-bottom separable flask equipped with a stirrer having a two-stage pitched blade paddle impellers of 50 mm in diameter, a thermometer, a reflux condenser and a nitrogen gas introducing tube, 282 g of Exxsol heptane (manufactured by Exxon Mobil Co.: Mixture of hydrocarbons, hereinafter referred to as a "dispersion medium") was weighted as a petroleum hydrocarbon dispersion medium.

To a round-bottom flask was added 0.74 g of a sucrose fatty acid ester (manufactured by Mitsubishi-Kagaku Foods Corporation, trade name: S-370) as a surfactant and 0.74 g of a maleic anhydride-modified ethylene-propylene copolymer (manufactured by Mitsui Chemicals, Inc., trade name: HIWAX 1105A) as a hydrophobic polymeric dispersion agent, and then this was warmed up to about 80° C. with a water bath at 85° C. at a stirring rate of 300 rpm to dissolve and disperse it before air cooling to an inner temperature of 64° C.

The above-mentioned aqueous monomer solution was charged once into the above dispersion medium with an increased stirring rate of 550 rpm by using a funnel made of SUS, having an inside diameter of 8 mm at opening at the tip. After adding the aqueous monomer solution, the atmosphere in the system was well substituted with nitrogen while maintaining the inner temperature of the round-bottom flask containing the dispersion at 40° C., and the first stage radical polymerization reaction was performed by warming for 1 hour with a hot water bath at 70° C.

After completion of the first stage polymerization, the dispersion medium at room temperature is added, the stirring rate was increased to 1,000 rpm and the inner temperature was cooled to near 30° C. to precipitate at least a part of the surfactant.

Separately, to a 500 mL Erlenmeyer flask, 128.8 g of 80 mass % acrylic acid was added and neutralized by adding dropwise 142.9 g of 30 mass % sodium hydroxide under stirring while cooling the flask from the outside. To this were added 0.15 g of potassium persulfate, 11.6 mg of ethylene glycol diglycidyl ether and 16.7 g of distilled water to prepare an aqueous monomer solution in the second stage polymerization.

Next, the aqueous monomer solution for the above-mentioned second stage was added to the above-mentioned cooled polymerization slurry through the dropping funnel, and stirred to mix for some time, and absorbed into a polymerization gel in the first stage to aggregate hydrous gel particles.

Then, the atmosphere in the system was well substituted with nitrogen while maintaining the inner temperature of the round-bottom flask near room temperature, and the second stage radical polymerization reaction was performed by warming for 1 hour with a hot water bath at 70° C.

After the polymerization reaction in the second stage, the reaction suspension was heated using an oil bath at 120° C. and 223 g of water was removed off from the system by azeotropic distillation while refluxing the dispersion medium in the flask to obtain a dehydrated polymer dispersed in the dispersion medium. To the resultant dispersion medium dispersed dehydrated polymer, 3.9 g of a 2% aqueous solution of ethylene glycol diglycidyl ether as a post-crosslinking agent was added and the post-crosslinking reaction was performed at 83° C. for 2 hours.

Then, heating is performed using an oil bath at 120° C., the dispersion medium and water were removed off from the system by distillation, followed by drying under a nitrogen gas flow to obtain 224 g of a water-absorbent resin having in a form of aggregated spherical particles by passing through a sieve of 850 μm. This water-absorbent resin had a median particle size of 388 μm, and a water content of 6.2%.

Comparative Example 1

The same experiment as in Example 1, except that PVA was not used, was performed.

The same experiment as in Example 1, except that in the preparation of an aqueous monomer solution, 12.6 g of distilled water was added substituted for 5% by mass PVA, was performed to obtain 91 g of a water-absorbent resin having a spherical shape (partially in a form of aggregated spherical particles). This water-absorbent resin had a median particle size of 61 μm, and a water content of 2.6%.

Comparative Example 2

As Comparative Example, 0.3% by mass of hydroxyethyl cellulose (hereinafter abbreviated to "HEC") based on a mass of a monomer was used as a thickener to perform a polymerization.

Specifically, into a 500 mL Erlenmeyer flask, 92.0 g of 80% by mass of acrylic acid was charged and neutralized by adding dropwise 102.2 g of 30% by mass sodium hydroxide under stirring while cooling the flask from the outside.

To this were added 32.1 g of water, followed by 0.272 g of HEC (manufactured by Sumitomo Seika Chemicals Co., Ltd.: AW-15F) to dissolve it by stirring.

To this were added 0.073 g of potassium persulfate, 8.3 mg of ethylene glycol diglycidyl ether and 10 g of distilled water to prepare an aqueous monomer solution.

Subsequently, the same operation as in Example 1, except that the above-mentioned aqueous monomer solution was used, was performed to obtain 89 g of a water-absorbent resin having a spherical shape (partially in a form of aggregated spherical particles). This water-absorbent resin had a median particle size of 87 μm, and a water content of 3.1%.

Comparative Example 3

The same operation as in Example 1, except that the stirring rate of 500 rpm for mixing and polimerizing the aqueous monomer solution in the dispersion medium in Comparative Example 2 was changed to 700 rpm, was performed to obtain 90 g of a water-absorbent resin having a spherical shape (partially in a form of aggregated spherical particles). This water-absorbent resin had a median particle size of 55 μm, and a water content of 2.4%.

Comparative Example 4

An amount of the thickener HEC was increased to 1.0% by mass based on an amount of the monomer to perform a polymerization. Specifically, into a 500 mL Erlenmeyer flask, 92.0 g of 80% by mass of acrylic acid was charged and neutralized by adding dropwise 102.2 g of 30% by mass sodium hydroxide under stirring while cooling the flask from the outside.

To this were added 32.1 g of water, followed by 0.904 g of HEC (manufactured by Sumitomo Seika Chemicals Co., Ltd.: AW-15F) to dissolve it by stirring.

To this were added 0.073 g of potassium persulfate, 8.3 mg of ethylene glycol diglycidyl ether and 10 g of distilled water to prepare an aqueous monomer solution.

Subsequently, the same operation as in Example 1, except that the above-mentioned aqueous monomer solution was used, was performed to obtain 86 g of a water-absorbent resin having a spherical shape (partially in a form of aggregated spherical particles). This water-absorbent resin had a median particle size of 183 μm, and a water content of 4.0%.

Comparative Example 5

0.1% by mass of xanthan-gum was used substituted for 0.3% by mass of HEC as a thickener in Comparative Example 2 to perform a polymerization.

Specifically, into a 500 mL Erlenmeyer flask, 92.0 g of 80% by mass of acrylic acid was charged and neutralized by adding dropwise 102.2 g of 30% by mass sodium hydroxide under stirring while cooling the flask from the outside.

To this were added 32.3 g of water, followed by 0.091 g of xanthan-gum (manufactured by Sansho Co., Ltd.: KELZAN) to dissolve and disperse it by stirring.

To this were added 0.11 g of potassium persulfate, 8.3 mg of ethylene glycol diglycidyl ether and 10 g of distilled water to prepare an aqueous monomer solution.

Subsequently, the same operation as in Example 1, except that the above-mentioned aqueous monomer solution was used, was performed to obtain 87 g of a water-absorbent resin having a spherical shape (partially in a form of aggregated spherical particles). This water-absorbent resin had a median particle size of 89 μm, and a water content of 3.3%.

Comparative Example 6

Two-stage polymerization without PVA was performed.

Into a 500 mL Erlenmeyer flask, 92.0 g of 80% by mass of acrylic acid was charged and neutralized by adding dropwise 102.2 g of 30% by mass sodium hydroxide under stirring while cooling the flask from the outside. To this were added 0.07 g of potassium persulfate, 10.1 mg of ethylene glycol diglycidyl ether and 30.9 g of distilled water to prepare, stir and mix an aqueous monomer solution.

In a 2 L volumetric five-necked cylindrical round-bottom separable flask equipped with a stirrer having a two-stage pitched blade paddle impellers of 50 mm in diameter, a thermometer, a reflux condenser and a nitrogen gas introducing tube, 282 g of Exxsol heptane (manufactured by Exxon Mobil Co.: Mixture of hydrocarbons, hereinafter referred to as a "dispersion medium") was weighted as a petroleum hydrocarbon dispersion medium.

To the round-bottom flask was added 0.74 g of a sucrose fatty acid ester (manufactured by Mitsubishi-Kagaku Foods Corporation, trade name: S-370) as a surfactant and 0.74 g of a maleic anhydride-modified ethylene-propylene copolymer (manufactured by Mitsui Chemicals, Inc., trade name: HIWAX 1105A) as a hydrophobic polymeric dispersion agent, and then this was warmed up to about 80° C. with a water bath at 85° C. at a stirring rate of 300 rpm to dissolve and disperse it before air cooling to an inner temperature of 64° C.

The above-mentioned aqueous monomer solution was charged once into the above dispersion medium with an increased stirring rate of 500 rpm by using a funnel made of SUS, having an inside diameter of 8 mm at opening at the tip. After adding the aqueous monomer solution, the atmosphere in the system was well substituted with nitrogen while maintaining the inner temperature of the round-bottom flask containing the dispersion at 40° C., and the first stage radical polymerization reaction was performed by warming for 1 hour with a hot water bath at 70° C.

After completion of the first stage polymerization, the stirring rate was increased to 1,000 rpm and the inner temperature was cooled to near 30° C. to precipitate at least a part of the surfactant.

Separately, to a 500 mL Erlenmeyer flask, 128.8 g of 80 mass % acrylic acid was added and neutralized by adding dropwise 142.9 g of 30 mass % sodium hydroxide under stirring while cooling the flask from the outside. To this were added 0.15 g of potassium persulfate, 11.6 mg of ethylene glycol diglycidyl ether and 16.7 g of distilled water to prepare an aqueous monomer solution in the second stage polymerization.

Next, the aqueous monomer solution for the above-mentioned second stage was added to the above-mentioned cooled polymerization slurry through the dropping funnel, and stirred to mix for some time, and absorbed into a polymerization gel in the first stage to aggregate hydrous gel particles.

Then, the atmosphere in the system was well substituted with nitrogen while maintaining the inner temperature of the round-bottom flask near room temperature, and the second stage radical polymerization reaction was performed by warming for 1 hour with a hot water bath at 70° C.

After the polymerization reaction in the second stage, the reaction suspension was heated using an oil bath at 120° C. and 224 g of water was removed off from the system by azeotropic distillation while refluxing the dispersion medium in the flask to obtain a dehydrated polymer dispersed in the dispersion medium. To the resultant dispersion medium dispersed dehydrated polymer, 3.9 g of a 2% aqueous solution of ethylene glycol diglycidyl ether as a post-crosslinking agent was added and the post-crosslinking reaction was performed at 83° C. for 2 hours.

Then, heating is performed using an oil bath at 120° C., the dispersion medium and water were removed off from the system by distillation, followed by drying under a nitrogen gas flow to obtain 225 g of a water-absorbent resin having in a form of aggregated spherical particles by passing through a sieve of 850 μm. This water-absorbent resin had a median particle size of 428 μm, and a water content of 6.3%.

Comparative Example 7

As a comparative example, an aqueous monomer solution at the first stage in which 0.3% by mass of the thickener HEC was added based on an amount of the monomer, was used to perform a two-stage polymerization.

Into a 500 mL Erlenmeyer flask, 92.0 g of 80% by mass of acrylic acid was charged and neutralized by adding dropwise 102.2 g of 30% by mass sodium hydroxide under stirring while cooling the flask from the outside.

To this were added 32.1 g of water, followed by 0.272 g of HEC (manufactured by Sumitomo Seika Chemicals Co., Ltd.: AW-15F) to dissolve it by stirring.

To this were added 0.073 g of potassium persulfate, 8.3 mg of ethylene glycol diglycidyl ether and 10 g of distilled water to prepare an aqueous monomer solution.

Subsequently, the same operation as in Example 1, except that the stirring rate of 500 rpm for mixing and polimerizing the above-mentioned aqueous monomer solution in the dispersion medium is changed to 700 rpm, was performed to obtain 223 g of a water-absorbent resin having a spherical shape (partially in a form of aggregated spherical particles). This water-absorbent resin had a median particle size of 371 μm, and a water content of 5.9%.

Example 6

Polyvinyl pyrrolidone (hereinafter referred to as "PVP") as a hydrophilic polymeric dispersion agent was added to an aqueous monomer solution for the first stage polymerization at 1.0% by mass based on a mass of the aqueous monomer solution.

50 g of 5% by mass aqueous solution of PVP (manufactured by ISP Japan Co. Ltd.: K-90) was prepared prior to the preparation of an aqueous monomer solution. Subsequently, into a 500 mL Erlenmeyer flask, 92.0 g of 80% by mass of acrylic acid was charged and neutralized by adding dropwise 102.2 g of 30% by mass sodium hydroxide under stirring while cooling the flask from the outside. To this were added 0.11 g of potassium persulfate, 8.3 mg of ethylene glycol diglycidyl ether, 18.1 g of the above-mentioned 5 mass % PVP aqueous solution and 25.5 g of ion exchange water to prepare, and stir to mix an aqueous monomer solution.

In a 2 L volumetric six-necked round-bottom flask equipped with a stirrer having a two-stage pitched blade paddle impellers of 50 mm in diameter, a thermometer, a reflux condenser and a nitrogen gas introducing tube, 342 g of heptane was weighted as a petroleum hydrocarbon dispersion medium. To the round-bottom flask were added 0.92 g of a sucrose fatty acid ester (manufactured by Mitsubishi-Kagaku Foods Corporation, trade name: S-370) as a surfactant, and 0.46 g of an oxidized ethylene-propylene copolymer (manufactured by Mitsui Chemicals, Inc., trade name: HIWAX 4052E) and 0.46 g of a maleic anhydride-modified ethylene-propylene copolymer (manufactured by Mitsui Chemicals, Inc., trade name: HIWAX 1105A) as a hydrophobic polymeric dispersion agent, 0.46 g of a maleic anhydride-modified ethylene-propylene copolymer (manufactured by Mitsui Chemicals, Inc., trade name: HIWAX 1105A) as a hydrophobic polymeric dispersion agent, and then this was warmed up to 83 to 86° C. with a water bath at 90° C. at a stirring rate of 300 rpm to dissolve and disperse it before air cooling to an inner temperature of 61° C. The above-mentioned aqueous monomer solution was added by using a funnel made of SUS, having an inside diameter of 8 mm at opening at the tip, and dispersed while stirring them at 300 rpm. It was stirred at 300 rpm for 10 minutes, and then the stirring rate was increased to 500 rpm.

The atmosphere in the system was well substituted with nitrogen while maintaining the inner temperature of the round-bottom flask at 40° C., and a radical polymerization reaction was performed by warming for 1 hour with a hot water bath at 70° C.

After completion of the first stage polymerization, the stirring rate was increased to 1,000 rpm and the inner temperature was cooled to 30° C. or less to precipitate at least a part of the surfactant.

Separately, to a 500 mL Erlenmeyer flask, 128.8 g of 80 mass % acrylic acid was added and neutralized by adding dropwise 142.9 g of 30 mass % sodium hydroxide under stirring while cooling the flask from the outside. To this were added 0.15 g of potassium persulfate, 11.6 mg of ethylene glycol diglycidyl ether and 16.7 g of distilled water to prepare an aqueous monomer solution in the second stage polymerization.

Next, the aqueous monomer solution for the above-mentioned second stage polymerization was added to the above-mentioned cooled polymerization slurry through a dropping funnel, stirred to mix for some time, and absorbed into a polymerization gel in the first stage to aggregate hydrous gel particles.

Then, the atmosphere in the system was well substituted with nitrogen while maintaining the inner temperature of the round-bottom flask, and a radical polymerization reaction was performed by warming for 1 hour with a hot water bath at 70° C.

After the polymerization reaction in the second stage, the reaction suspension was heated using an oil bath at 120° C. and 260 g of water was removed off from the system by azeotropic distillation while refluxing heptane in the flask to obtain a dehydrated polymer dispersed in heptane. To the resultant heptane dispersed dehydrated polymer, 8.2 g of a 2% aqueous solution of ethylene glycol diglycidyl ether as a post-crosslinking agent was added and the post-crosslinking reaction was performed at 83° C. for 2 hours.

Then, heating is performed using an oil bath at 120° C., heptane and water were removed off from the system by distillation, followed by drying under a nitrogen gas flow to obtain 225 g of a water-absorbent resin having in a form of aggregated spherical particles by passing through a sieve of 850 μm. This water-absorbent resin had a median particle size of 389 μm, and a water content of 4.8%.

The measurement results of the remaining dispersion medium for the resultant water-absorbent resin obtained by Examples and Comparative Examples are shown in the following table. In addition, since Exxsol heptane used in experiments is a mixed hydrocarbon dispersion medium as described above, a plurality of peaks in head space gas chromatograph upon measuring the amount of the remaining dispersion medium were observed. Therefore, each peak area was integrated to calculate an amount of the remaining dispersion medium.

TABLE 1

| | Polymerization | Additives to monomers at first stage | | Stirring rate upon polymerization [rpm] First/Second | Median particle size [μm] | Amount of remaining dispersion medium [ppm] |
|---|---|---|---|---|---|---|
| | | Kinds | Added amount (vs Monomer) [% by mass] | | | |
| Example 1 | One stage | PVA GH-20 | 0.7 | 500 | 83 | 496 |
| Example 2 | One stage | PVA GH-20 | 0.7 | 550 | 63 | 581 |
| Example 3 | One stage | PVA GH-23 | 0.7 | 500 | 100 | 420 |
| Example 4 | One stage | PVA PVA403 | 2.0 | 700 | 51 | 383 |
| Example 5 | Two stages | PVA GH-20 | 0.7 | 550/1000 | 388 | 297 |
| Example 6 | Two stages | PVP K-90 | 1.0 | 500/1000 | 389 | 309 |
| Comparative Example 1 | One stage | — | — | 500 | 61 | 18038 |
| Comparative Example 2 | One stage | HEC | 0.3 | 500 | 87 | 5680 |
| Comparative Example 3 | One stage | HEC | 0.3 | 700 | 55 | 7604 |
| Comparative Example 4 | One stage | HEC | 1.0 | 500 | 183 | 1472 |
| Comparative Example 5 | One stage | xanthan-gum | 0.1 | 500 | 89 | 5014 |
| Comparative Example 6 | Two stages | — | — | 500/1000 | 428 | 8534 |
| Comparative Example 7 | Two stages | HEC | 0.3 | 700/1000 | 371 | 2855 |

PVA . . . Polyvinyl alcohol
HEC . . . Hydroxyethyl cellulose

As shown in the table, any water-absorbent resin of Examples 1 to 6 had an amount of the remaining dispersion medium reduced significantly as compared with those of all Comparative Examples.

More specifically, the remaining dispersion medium was reduced as shown in Comparative Examples 2-5 by adding a water soluble thickener to an aqueous monomer solution as compared with Comparative Example 1 (non-use of additives), and it was observed that the remaining dispersion medium can be reduced to 1,000 ppm or less as described in Examples 1 to 6 when a hydrophilic polymeric dispersion agent is added to perform a polymerization. Since a hydrophilic polymeric dispersion agent has a smaller increasing effect of particle size as compared with a thickener, the hydrophilic polymeric dispersion agent can be easily used from viewpoints of controlling particle size and a reducing effect of a remaining dispersion medium is very high. Therefore, it is considered that the hydrophilic polymeric dispersion agent is very effective to reduce a remaining dispersion medium of a water-absorbent resin, namely, to reduce an odor originating from a petroleum hydrocarbon dispersion medium upon water absorption.

INDUSTRIAL APPLICABILITY

The present invention provides a method for producing a water-absorbent resin, wherein an amount of a remaining petroleum hydrocarbon dispersion medium used in a reversed phase suspension polymerization, which is contained in the water-absorbent resin and an odor originated form the petroleum hydrocarbon dispersion medium is further reduced, and a water-absorbent resin obtained by the method.

The invention claimed is:

1. A method for producing a water-absorbent resin by performing a reversed-phase suspension polymerization of a water-soluble ethylenically unsaturated monomer in a petroleum hydrocarbon dispersion medium, consisting essentially of the steps;
   forming an aqueous solution of a water-soluble ethylenically unsaturated monomer containing a hydrophilic polymeric dispersion agent;
   forming a mixture of a petroleum hydrocarbon dispersion medium and a hydrophobic polymeric dispersion agent;
   adding and dispersing the aqueous solution of a water-soluble ethylenically unsaturated monomer containing the hydrophilic polymeric dispersion agent to the mixture of the petroleum hydrocarbon dispersion medium and the hydrophobic polymeric dispersion agent in the presence of a surfactant under stirring, and
   performing a reversed-phase suspension polymerization using a radical polymerization initiator.

2. The method according to claim 1 wherein the hydrophilic polymeric dispersion agent is at least one kind selected from the group consisting of polyvinyl alcohol and polyvinyl pyrrolidone.

3. The method for producing a water-absorbent resin according to claim 1, wherein the surfactant is at least one kind selected from the group consisting of polyglyceryl fatty acid ester, sucrose fatty acid ester and sorbitan fatty acid ester.

4. The method for producing a water-absorbent resin according to claim 1, wherein the water-soluble ethylenically unsaturated monomer is at least one kind selected from the group consisting of acrylic acid and its salt, methacrylic acid and its salt, and acrylamide.

5. The method according to claim 1, wherein the petroleum hydrocarbon dispersion medium is at least one kind selected from the group consisting of an aliphatic hydrocarbon and an alicyclic hydrocarbon, having a carbon number of 6 to 8.

6. A water-absorbent resin obtained by the method according to claim 1.

7. The method for producing a water-absorbent resin according to claim 2, wherein the surfactant is at least one kind selected from the group consisting of polyglyceryl fatty acid ester, sucrose fatty acid ester and sorbitan fatty acid ester.

8. The method for producing a water-absorbent resin according to claim 2, wherein the water-soluble ethylenically unsaturated monomer is at least one kind selected from the group consisting of acrylic acid and its salt, methacrylic acid and its salt, and acrylamide.

9. The method for producing a water-absorbent resin according to claim 3, wherein the water-soluble ethylenically unsaturated monomer is at least one kind selected from the group consisting of acrylic acid and its salt, methacrylic acid and its salt, and acrylamide.

10. The method according to claim 2, wherein the petroleum hydrocarbon dispersion medium is at least one kind selected from the group consisting of an aliphatic hydrocarbon and an alicyclic hydrocarbon, having a carbon number of 6 to 8.

11. The method according to claim 3, wherein the petroleum hydrocarbon dispersion medium is at least one kind selected from the group consisting of an aliphatic hydrocarbon and an alicyclic hydrocarbon, having a carbon number of 6 to 8.

12. The method according to claim 4, wherein the petroleum hydrocarbon dispersion medium is at least one kind selected from the group consisting of an aliphatic hydrocarbon and an alicyclic hydrocarbon, having a carbon number of 6 to 8.

13. The method according to claim 1, wherein the hydrophobic polymeric dispersion agent is selected from the groups consisting of maleic anhydride-modified polyethylene, maleic anhydride-modified polypropylene, maleic anhydride-modified ethylene-propylene copolymer, a maleic anhydride-ethylene copolymer maleic anhydride-propylene copolymer, maleic anhydride-ethylene-propylene copolymer, polyethylene, polypropylene, ethylene-propylene copolymer, oxidized polyethylene, oxidized polypropylene and oxidized ethylene-propylene copolymer.

* * * * *